United States Patent
Puchalla

(10) Patent No.: US 8,157,082 B2
(45) Date of Patent: Apr. 17, 2012

(54) SEGMENT BODIES AND SCRAPERS FOR CONVEYOR BELT SCRAPERS

(75) Inventor: Adam Puchalla, Marl (DE)

(73) Assignee: Rema Tip Top GmbH, Poing (DE)

( * ) Notice: Subject to any disclaimer, the term of this patent is extended or adjusted under 35 U.S.C. 154(b) by 0 days.

(21) Appl. No.: 13/100,940

(22) Filed: May 4, 2011

(65) Prior Publication Data

US 2011/0203070 A1 Aug. 25, 2011

Related U.S. Application Data

(63) Continuation of application No. PCT/EP2009/064040, filed on Oct. 26, 2009.

(30) Foreign Application Priority Data

Nov. 10, 2008 (DE) .......................... 10 2008 056 662

(51) Int. Cl.
*B65G 45/16* (2006.01)
(52) U.S. Cl. .......................................................... 198/499
(58) Field of Classification Search .................. 198/499, 198/497
See application file for complete search history.

(56) References Cited

U.S. PATENT DOCUMENTS

| | | | | |
|---|---|---|---|---|
| 3,674,131 A | * | 7/1972 | Matson | 198/499 |
| 4,036,354 A | | 7/1977 | Reiter | |
| 4,359,150 A | * | 11/1982 | Bowman et al. | 198/497 |
| 4,529,084 A | * | 7/1985 | Zhang | 198/499 |
| 4,838,409 A | * | 6/1989 | Rappen | 198/497 |
| 5,014,844 A | | 5/1991 | Anttonen | |
| 5,114,000 A | | 5/1992 | Rappen | |
| 5,950,803 A | * | 9/1999 | Schwarze | 198/499 |
| 7,428,960 B2 | * | 9/2008 | Hall | 198/499 |
| 2007/0170041 A1 | * | 7/2007 | Hall | 198/499 |

FOREIGN PATENT DOCUMENTS

| | | |
|---|---|---|
| DE | 3644934 A1 | 4/1988 |
| DE | 3831033 C2 | 1/1990 |
| DE | 3930204 A1 | 3/1991 |
| DE | 9416219 U1 | 1/1995 |
| EP | 0847942 A1 | 6/1998 |
| WO | 2010/052145 A1 | 5/2010 |

OTHER PUBLICATIONS

Patent Cooperation Treaty, "International Search Report," issued by the International Searching Authority in connection with related PCT application No. PCT/EP2009/064040, issued Mar. 22, 2010 (6 pages).

Patent Cooperation Treaty, "Written Opinion of the International Searching Authority," issued by the International Searching Authority in connection with related PCT application No. PCT/EP2009/064040, issued Mar. 22, 2010 (8 pages).

\* cited by examiner

*Primary Examiner* — James R Bidwell
(74) *Attorney, Agent, or Firm* — Hanley, Flight and Zimmerman, LLC

(57) ABSTRACT

Example segment bodies and scrapers for conveyor belt scrapers are disclosed. An example segment body for a conveyor belt scraper includes a mounting body that can be connected to a segment carrier in a rotationally fixed manner, a holding portion that is designed for applying force from at least one wear element, a support portion in contact with the holding portion and the mounting body, and at least one spring element provided between the holding portion and the mounting body, which interacts with the mounting body and the holding portion in such a way that a force can be transmitted from the at least one spring element to the holding portion.

22 Claims, 16 Drawing Sheets

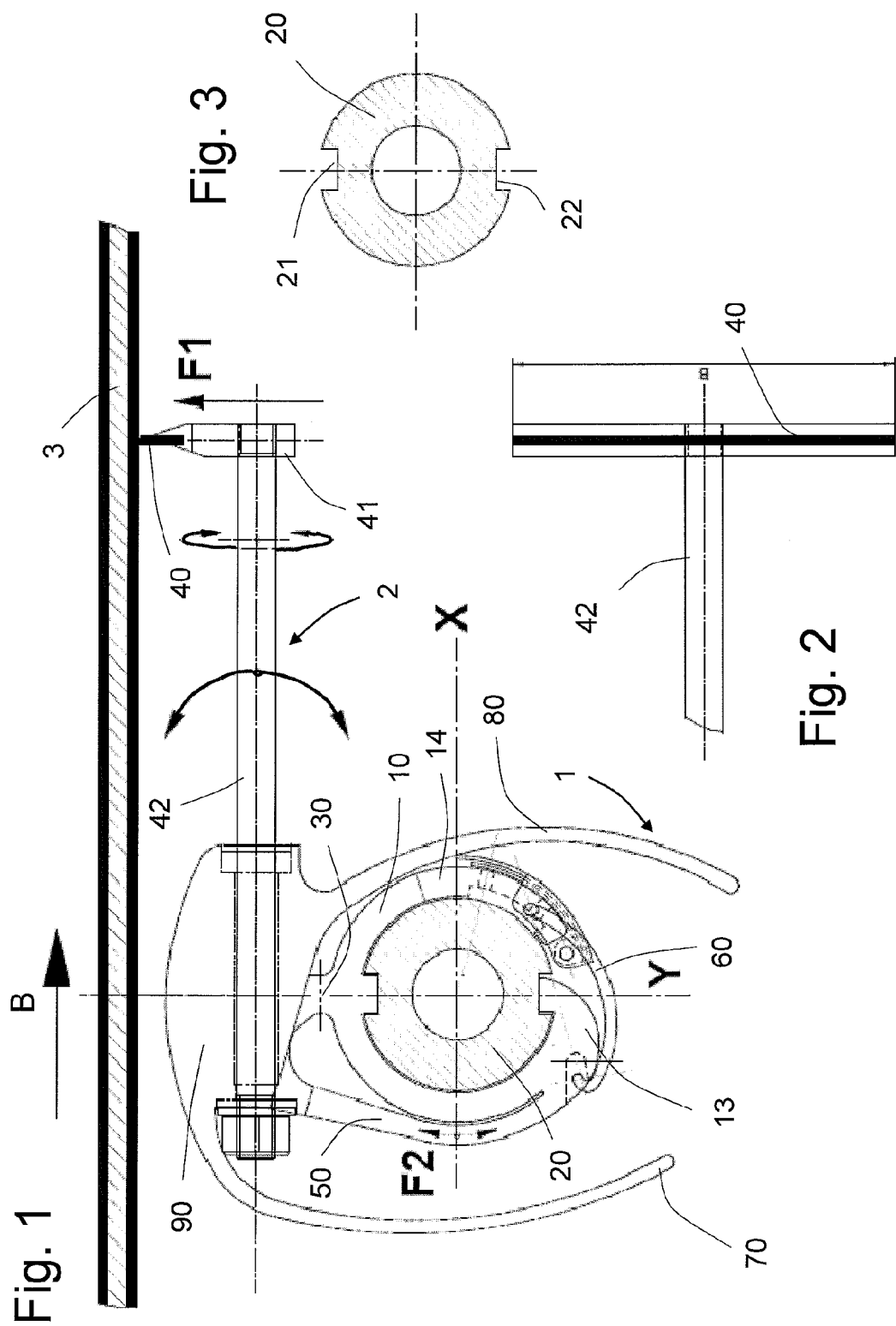

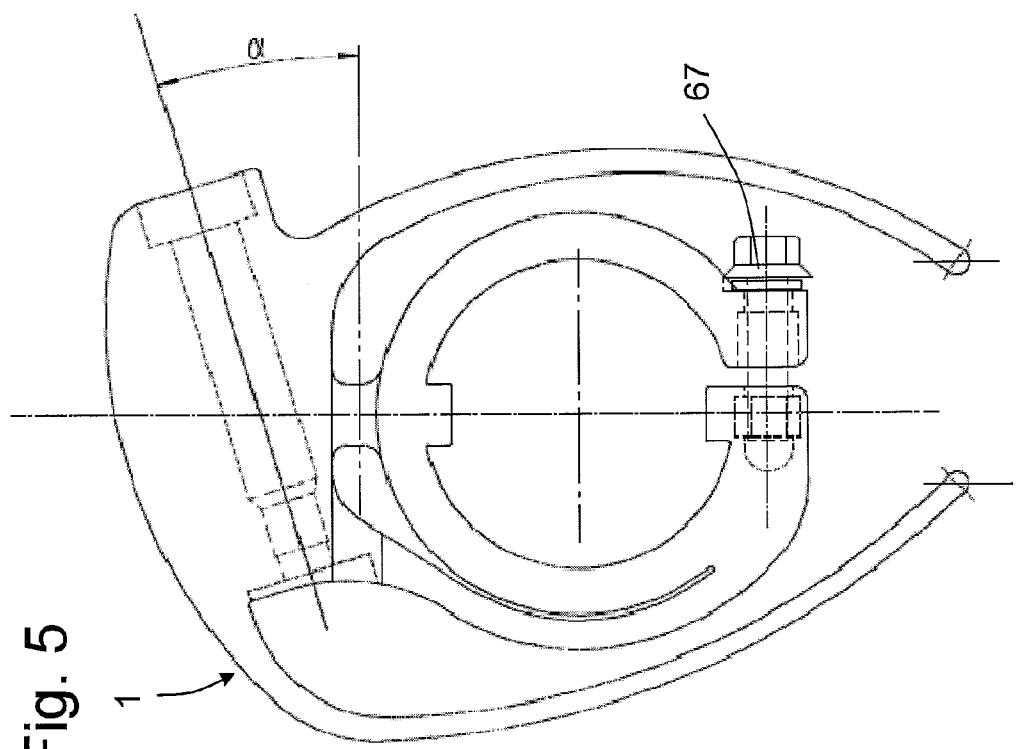
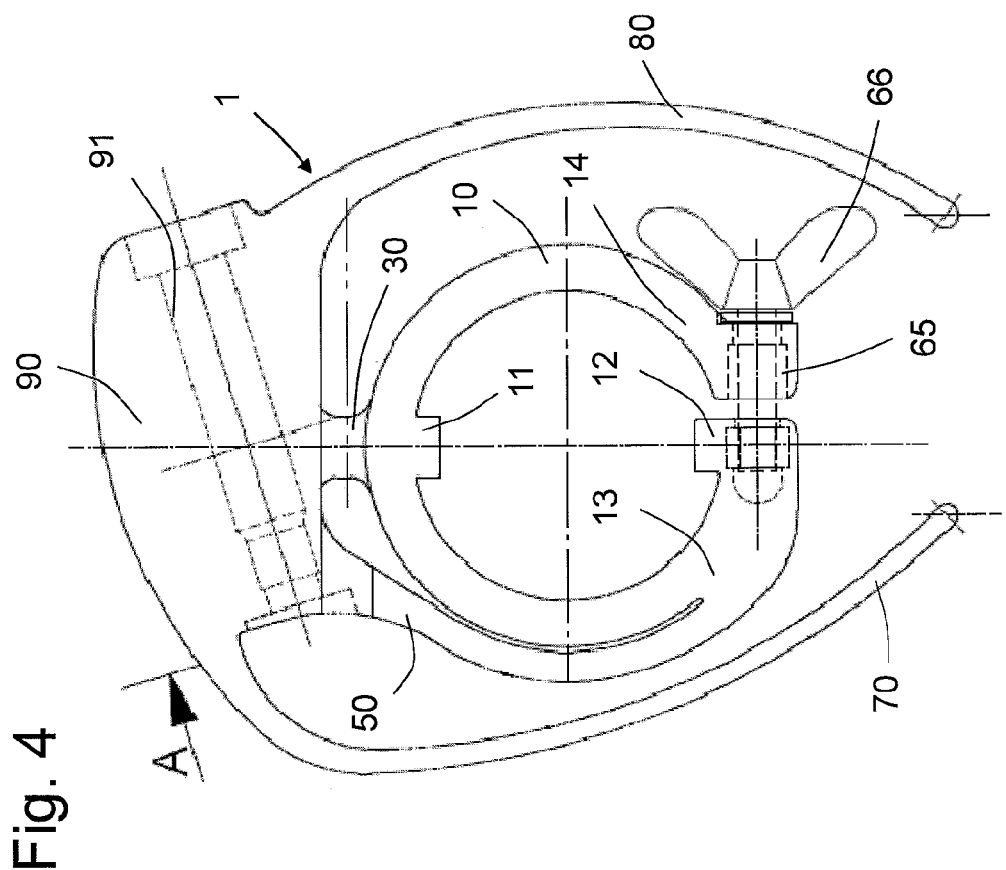

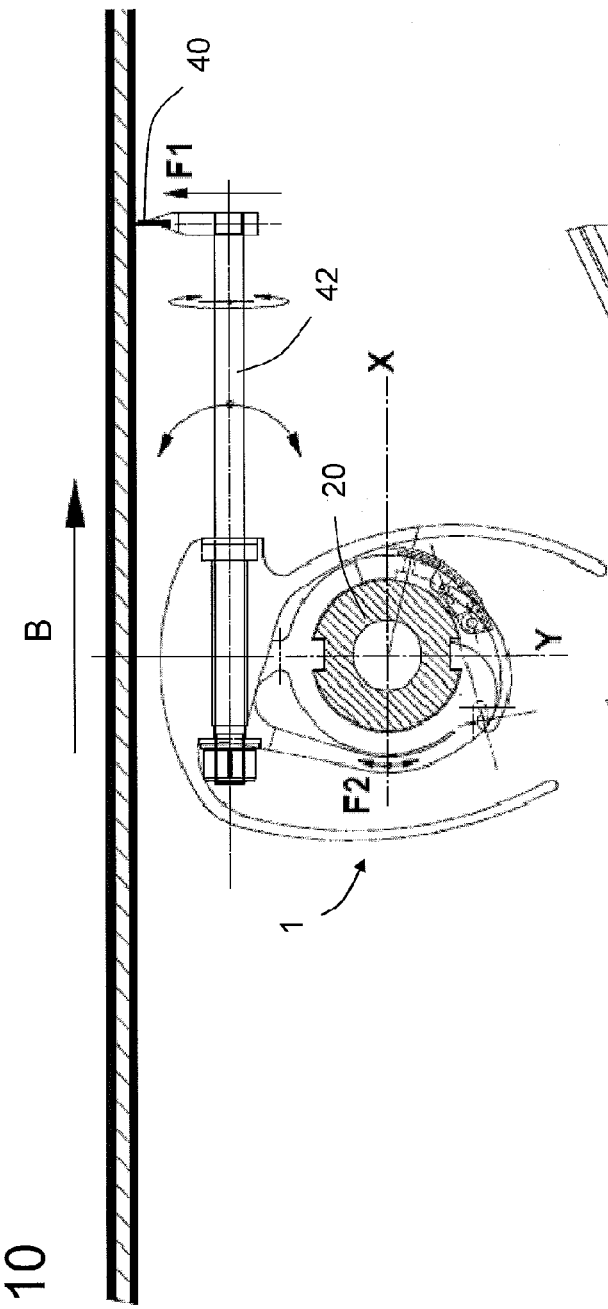
Fig. 10
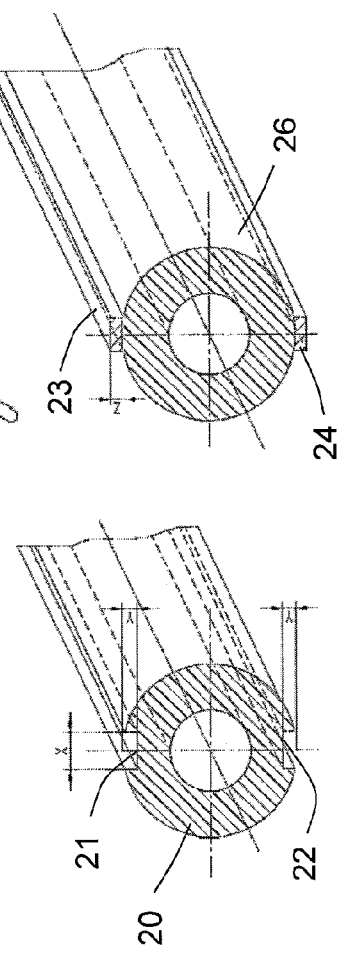
Fig. 11a
Fig. 11b

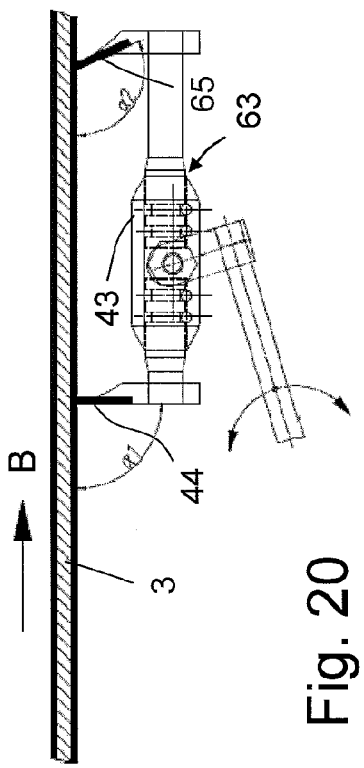
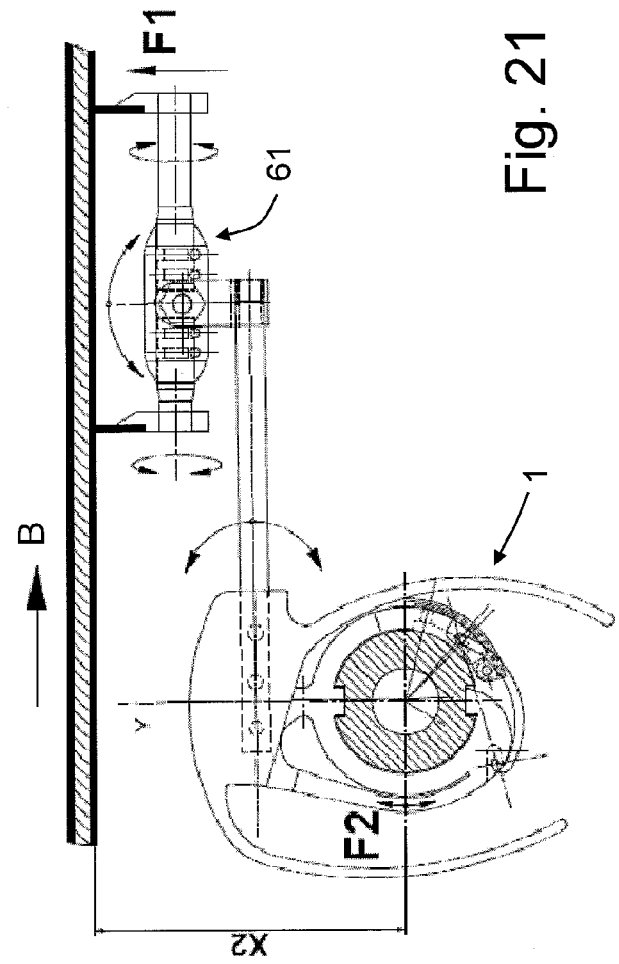
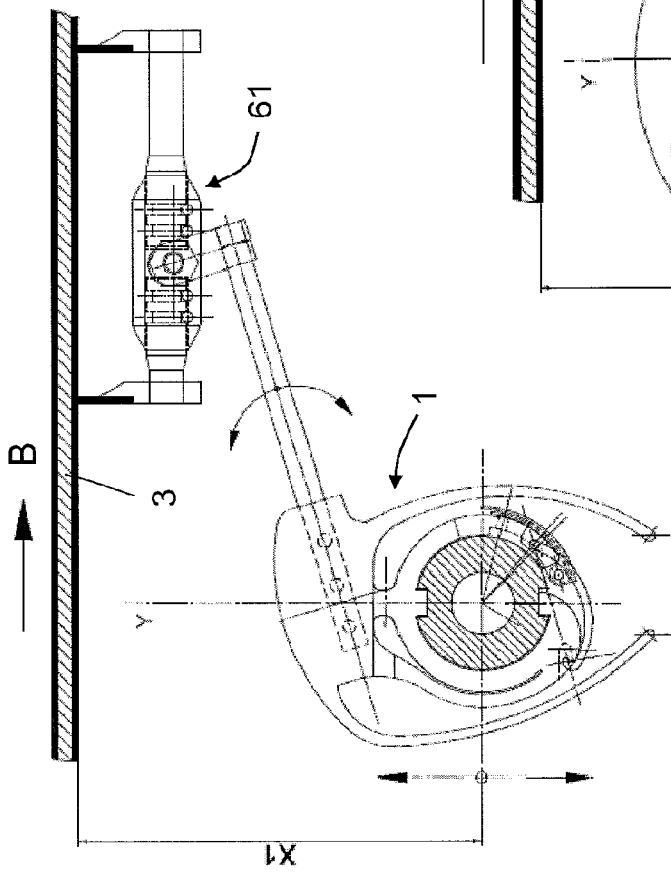

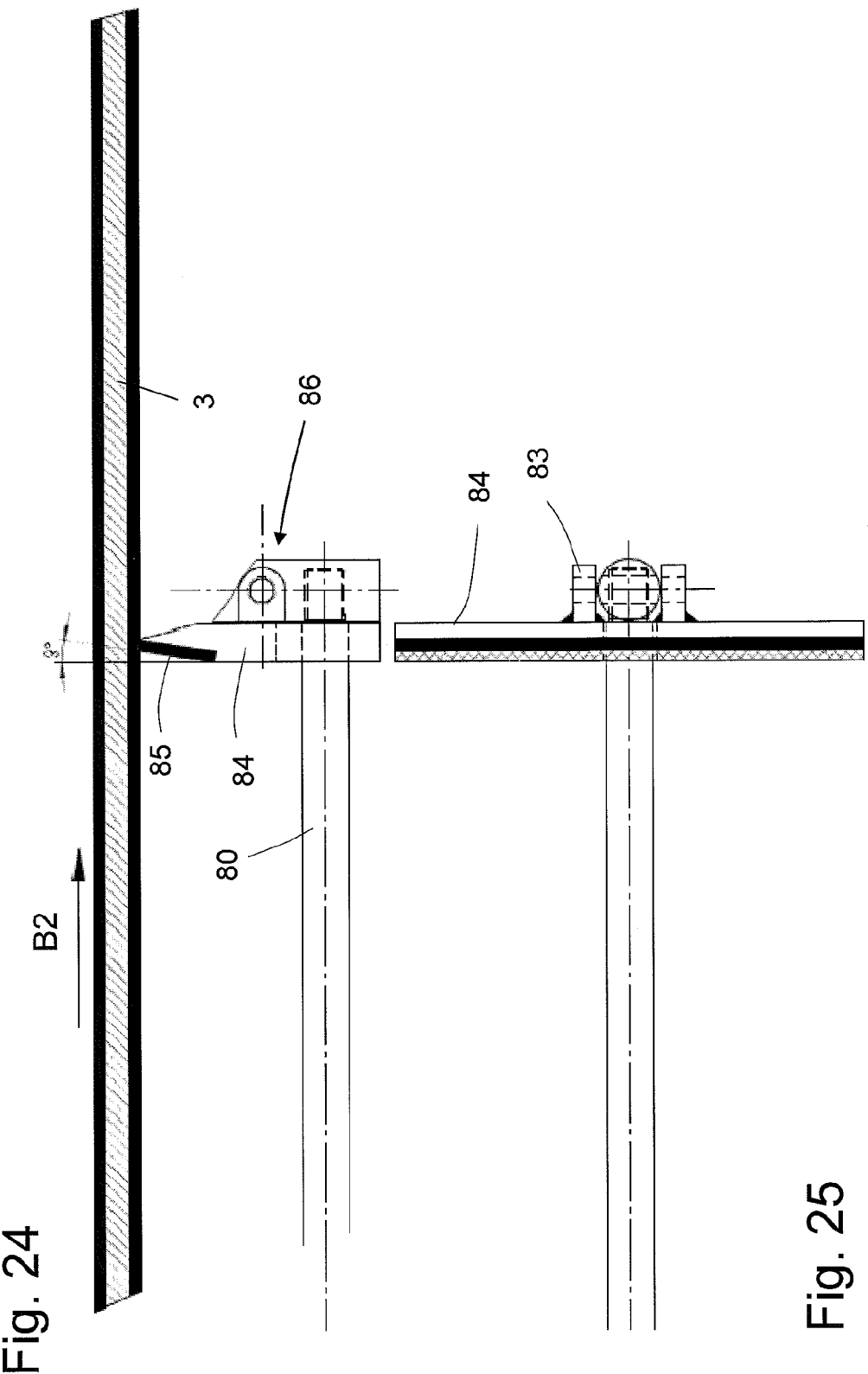

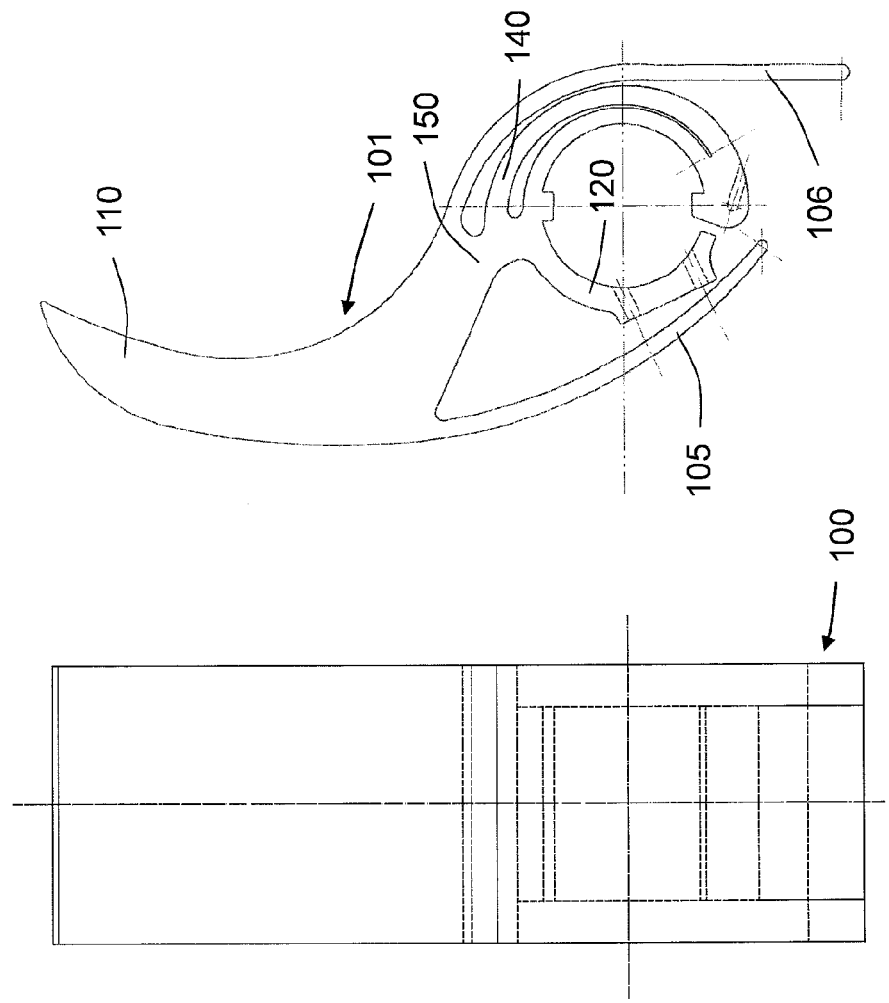
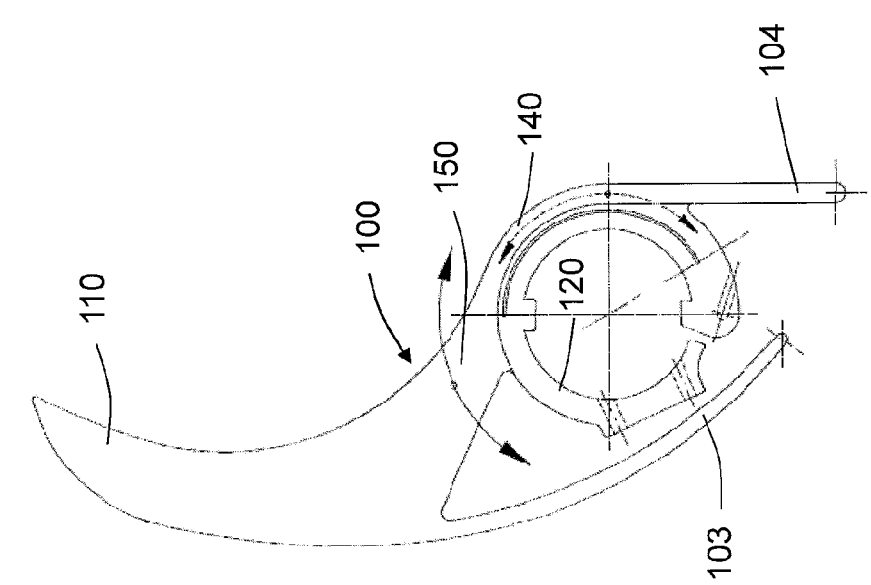
Fig. 28
Fig. 27
Fig. 26

SEGMENT BODIES AND SCRAPERS FOR CONVEYOR BELT SCRAPERS

RELATED APPLICATIONS

This patent is a continuation of International Patent Application No. PCT/EP2009/064040, filed on Oct. 26, 2009, which claims priority to German Patent Application No. 10 2008 056 662.4, filed on Nov. 10, 2008, both of which are incorporated herein by reference in their entireties.

FIELD OF THE DISCLOSURE

The present disclosure relates generally to conveyor belts and, more particularly, to segment bodies and scrapers for conveyor belt scrapers.

BACKGROUND

From the prior art, a variety of conveyor belt scrapers are known. These particularly serve to clean conveyor belts at the drum or immediately behind the drum on the track during operation. The most cost-efficient method for cleaning the conveyor belt is performed automatically, that is, a scraper is pressed against the circulating conveyor belt via a spring element, whereby the adhering dirt is separated off by the scraper and deflected to one side. In this course, depending on the application purpose or the magnitude of the press-on force required, different principles are used for providing the press-on force of the scraper on the conveyor belt.

Frequently, a plurality of flexible scraping elements are used, for example, across the width of the conveyor belt, which are vertically moved during assembly so far in the direction of the conveyor belt that said elements flexibly deform and thus apply a press-on force to the conveyor belt. However, the scraping elements have to be mounted very elaborately at several points to the carrier of the conveyor belt scraper or the carrier requires a particular labor-intensive construction which increases manufacturing costs.

Furthermore, in these scraper elements that use a spring made of steel there is a risk that in operation their resonant frequency is reached very quickly due to the contact with the moving conveyor belt so that their use is limited to a particular range of speed.

Conveyor belt scrapers having a torsional element for returning the scraper to the conveyor belt represent an alternative for generating the press-on force by means of deformable scraping elements in which either a spring or torsional springs is/are tensioned due to the vertical displacement of the scraper in the direction of the conveyor belt via an articulated lever and thus provides the press-on force of the scraper. DE 38 31 033 C2, for example, shows a cleaning device for a conveyor belt which stores an introduced force by means of four torsional spring elements disposed between a blade holder and a pipe and converts it into a press-on force for the scraper. A disadvantage of this device is the fact that the press-on force varies in dependence of the material property of the torsional spring elements, which, particularly when several scrapers are used, leads to non-uniform wear behavior of the scrapers across the width of the conveyor belt. Moreover, the construction of the scraper requires a plurality of components which makes assembly laborious and manufacture correspondingly expensive.

BRIEF DESCRIPTION OF THE DRAWINGS

Example advantageous designs and further details of disclosed examples will be described below by using different examples with reference to schematic Figures.

FIG. 1 shows a side view of a segment body with the scraper for a conveyor belt scraper according to a first example disclosed herein, FIG. 2 shows a plan view of the scraper according to FIG. 1, FIG. 3 shows a sectional view of a first example of a segment carrier according to FIG. 1, FIG. 4 shows a side view of a segment body according to a second example disclosed herein, FIG. 5 shows a side view of a segment body according to a second example disclosed herein, comprising a modified closure element, FIG. 10 shows a side view of the example segment body with the scraper according to FIG. 1 in a tensioned state with the first example of the segment carrier, FIG. 11a shows a perspective sectional view of the first example of the segment carrier according to FIG. 1, FIG. 11b shows a perspective sectional view of a third example of the segment carrier, FIG. 19 shows a side view of the segment body with the double scraper according to FIG. 16 in a non-tensioned state, FIG. 20 shows a side view of a fourth example of the double scraper, FIG. 21 shows a side view of the segment body with the double scraper according to FIG. 16 in a tensioned state, FIG. 24 shows a side view of the scraper according to FIG. 23 including a second direction of movement of the conveyor belt, FIG. 25 shows a plan view of the scraper according to FIG. 24, FIG. 26 shows a side view of a sixth example of the segment body comprising a wear element according to examples disclosed herein, FIG. 27 shows a rear view of the segment body according to FIG. 26, FIG. 28 shows a side view of a seventh example of the segment body with a wear element as a scraper according to examples disclosed herein.

DETAILED DESCRIPTION

Figure 7:
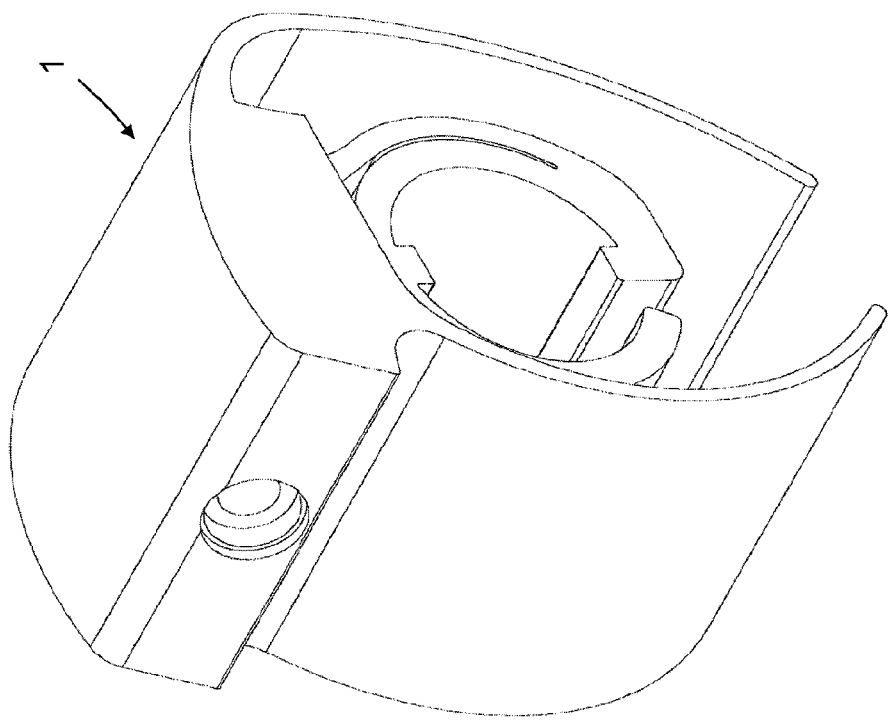
FIG. 7 shows a perspective view of the segment body according to FIG. 1.

In the following, disclosed examples are described in detail with reference to the attached Figures. However, the scope of coverage of this patent is not limited to the examples disclosed herein. To the contrary, this patent covers all methods, apparatus, systems, and articles of manufacture fairly falling within the scope of the appended claims either literally or under the doctrine of equivalents. In the Figures, same or similar features of the disclosed examples are denoted by the same reference numerals.

The disclosed examples relate to a segment body as well as a segment body with a scraper for a conveyor belt scraper which enables a simple assembly on the associated carrier and improved automatic adjustment of the scraper in case of wear. Furthermore, due to its compact and simplified structure the segment body with the scraper enables manufacture at low cost.

Examples disclosed herein provide an improved segment body for holding a scraper for a conveyor belt scraper that enables fast assembly at any position of the segment carrier across the entire width of the conveyor belt with little effort and an extended period of use while construction is compact, and that has a simplified structure whereby the conveyor belt scraper can be manufactured at low cost.

In some examples, a segment body for a conveyor belt scraper is provided which comprises a mounting body that can be connected to a segment carrier in a rotationally fixed manner, and that can have a holding portion that is designed for introducing force from at least one wear element. Furthermore, in the segment body a support portion may be in contact with the holding portion and the mounting body. Moreover, at least one spring element may be provided between the holding portion and the mounting body which spring element interacts with the mounting body and the holding portion in such a way that a force can be transmitted from the at least one spring element to the holding portion.

This example structure of the segment body for a conveyor belt scraper offers the advantage that thereby a very compact structure may be achieved for the segment body. Particularly in case of an integral formation of the segment body in combination with the use of a quick-release clamp it is possible that the former can be structured with a very low number of components so that the costs and the assembly work during manufacture can be reduced.

Furthermore, the input pre-tensioning force can be stored in the spring element and in operation be reversibly re-introduced into the scraper and thus in the direction of the conveyor belt as press-on force. Moreover, apart from the adjustment of the press-on force by means of the dimensioning of the spring element and the material selection thereof, it is additionally possible to realize an amplification or reduction of force via the selection of the lever lengths between the support portion and the spring element or the lever length between the support portion and the scraper.

Furthermore, the segment body can be mounted at any point of the segment carrier so that it is possible to realize a flexible mounting of one or more segment bodies along the length of the segment carrier. Thus, the dependence of the mounting position of the segment body along the length of the segment carrier which is determined by corresponding mounting bores on the segment carrier in segment bodies according to the prior art can be dispensed with.

A holding portion shall not only be understood as a portion with e.g. a bar-like design but ball-like or cylinder-like designs shall also be comprised in this term. The holding portion may also be designed in such a way, for example, that it can realize a joint-like functionality of adjacent portions. Furthermore, the holding portion may be formed such that a transmission of force from one adjacent portion to another adjacent portion is made possible. Moreover, the holding portion may be formed such that in dependence of the material used it is possible to flexibly deform the holding portion under load, and particularly in case synthetic materials are used the support portion may be formed such that it can show large changes of shape under load while the material behaves flexibly.

In some preferred examples, in the segment body at least one portion of the at least one spring element and at least one wear element in the tensioned state of the spring element may be oppositely disposed relative to a longitudinal axis of the mounting body located inside the inner side of the mounting body so that they are spaced apart. This arrangement advantageously allows the formation of a transmission mechanism which, for example, can transmit a force from the spring element to the scraper via the support portion.

Furthermore, the segment body may be an integral component. In some preferred examples, the segment body may comprise at least one mounting body, at least one holding portion, one support portion and at least one spring element so that a compact structure is created. In other preferred examples the segment body may comprise at least one mounting body, at least one holding portion, one support portion and at least one spring element and at least one protective flap so that the segment body can be protected against dropping contaminations. Furthermore, the segment body may also be formed as one piece.

In some preferred examples, the segment body may comprise a quick-release clamp. The use of a quick-release clamp allows a fast assembly and dismantling of the segment body on the segment carrier wherein the former can be disposed such that easy access to the quick-release clamp is made possible when it is opened or closed Furthermore, in the segment body at least one spring element may show a change of length under load. In some preferred examples, the spring element may lengthen under load while at the same time a thinning of the spring element may occur. In other examples the spring element under load may be subjected to a compression or shortening. Furthermore, the spring element may also be attached to the mounting body in such a way that thereby a change of length of the spring element can be adjusted so that a return force of the spring element and thus also the press-on force of the scraper on the conveyor belt can be adjusted.

In some preferred examples of the segment body the width of the at least one spring element may substantially correspond to the width of the mounting body. However, the width of the at least one spring element may also be larger than the width of the mounting body. Furthermore, the width of the at least one spring element may be smaller than the width of the mounting body.

Moreover, in a segment body according to examples disclosed herein, the thickness of at least one spring element may be differently selectable. Thus, the return force of the respective spring element can be influenced via its dimensions, here the selection of the thickness, so that a first adaptation can be made for different requirements by means of the constructive design thereof.

In some preferred examples, in a segment body the material of the at least one spring element may be different from the material of the segment body. This also allows a targeted control of the return force of the respective spring element, the former being dependent on the material of the spring element. Thus, for example, a very low or a very large increase of the return force can be adjusted when force is introduced into the spring element.

In some preferred examples of the segment body the at least one spring element may be replaceably connectable to the mounting body and the holding portion. This constructional structure may increase the flexibility of the segment bodies as, for example, existing segment bodies can be exchanged from one conveyor belt system to another and differently large return forces can respectively be adjusted locally via the selection of the replaceable spring element.

Furthermore, a segment body according to examples disclosed herein may comprise at least one protective flap disposed in a portion of the mounting body. In some preferred examples, the protective flap may be disposed at a longitudinal end of the segment body so that the connection of the mounting body to the segment carrier is particularly safely protected against dirt. Furthermore, in a segment body according to examples disclosed herein the width of at least one protective flap may correspond to the width of the mounting body whereby the entire width of the mounting body is protected against dirt.

In some preferred examples, in a segment body at least one spring element in a tensioned state may substantially be subjected to tension. Thus, in a structurally simple manner a transmission or reduction of force, for example, may be realized by means of a lever mechanism. Furthermore, it is possible to thus realize a particularly low-noise operational behavior of the conveyor belt scraper. In alternative examples, at least one spring element may be subjected to pressure, wherein forces may be deflected when using a lever mechanism.

A segment body may consist of an elastic material. For example, the segment body may consist of a synthetic material, in particular polyurethane. Furthermore, the segment body may consist of a material that allows a preferably flexible deformation and at the same time can dampen the introduced dynamic forces in the segment body.

Furthermore, in a segment body at least one portion of the at least one spring element can be disposed substantially adjacent to the outer portion of the mounting body. Thus, it is possible to realize a compact construction of the segment body so that the required installation space can be reduced.

In some examples, in a segment body in the portion of the adjoining of spring element and mounting body, the design of the spring element may substantially correspond to the design of the spring element. This advantageously allows the formation of a very short lever arm between the spring element and the holding portion when a lever mechanism is used so that a large force transmission can be achieved.

In some preferred examples of the segment body a relative movement between the holding portion and the mounting body via the support portion may be possible.

Furthermore in a segment body according to examples disclosed herein the mounting body may have at least one connecting element at the inner circumferential surface thereof for a form-fitting connection of the mounting body to the segment carrier. The connecting element may, for example, be formed as a kind of bar. Furthermore, the connecting element may, for example, be formed as a kind of groove.

In a segment body according to examples disclosed herein the mounting body may, in some preferred examples, be friction-locked with the segment carrier. Thus, the mounting body may e.g. be connected to the segment carrier via a screwed fastening with a correspondingly selected tension force.

Furthermore, in a segment body with a scraper according to examples disclosed herein at least one wear element may substantially have a design of a spatula.

In some preferred examples of the segment body with the scraper at least one wear element can be rotatably supported parallel to the longitudinal axis thereof so that the at least one wear element can be folded down. This enables a structurally simple realization of a wear element which is suitable for the reverse operation.

Moreover, in the segment body with the scraper a double holding body may be connected to the holding portion so as to be rotationally fixed in the transverse direction of the mounting body. Furthermore, the double holding body can be pivoted about an axis parallel to the longitudinal axis of the mounting body. Moreover, in the double holding body a respective wear element may be supported on opposite sides so as to be rotatable in the transverse direction of the mounting body. The wear elements oppositely disposed may be supported in the double holding body in such a way that the former can be rotated or swiveled independently of each other.

In a conveyor belt scraper according to examples disclosed herein for holding at least one segment body with the scraper, at least one segment body and scraper can, in some preferred examples, be attached to the segment carrier so as to be rotationally fixed.

Furthermore, in a conveyor belt scraper the segment carrier may have at least one groove in the outer circumferential portion.

In some preferred examples of the conveyor belt scraper, the segment carrier may have at least one bar in the outer circumferential portion which extends away from the segment carrier.

According to examples disclosed herein, a segment body is provided, comprising a mounting body that can be connected to a segment carrier in a rotationally fixed manner, and at least one wear element that is connected to the at least one spring element in an articulated manner by means of a deformable portion. Furthermore, the at least one spring element can interact with the mounting body and the wear element in such a way that the deformable portion in a tensioned state of the at least one spring element transmits a force between the at least one spring element and the wear element in an articulated manner, and in a tensioned state of the at least one spring element at least one portion of the at least one spring element and the wear element may be oppositely disposed relative to a longitudinal axis of the mounting body located inside the inner side of the mounting body so that they are spaced apart.

A deformable portion shall not only be understood to be a portion having, for example, a bar-like design, but the deformable portion may also directly realize the functionality of a joint with a relatively moving arrangement of several components. For example, the deformable portion may also be formed in such a way that said deformable portion can realize a joint-like functionality of adjacent portions. Furthermore, the deformable portion can be formed such that a transmission of force from one adjacent portion to another adjacent portion is made possible. Moreover, the deformable portion can be formed such that in dependence of the material used a flexible deformation of the deformable portion under load is possible, and in particular when synthetic materials are used the deformable portion may be formed such that under load it may show large changes of shape while the material behaves flexibly.

Referring to FIG. 1, a segment body 1 and scraper 2 for a conveyor belt scraper is schematically shown according to a first example disclosed herein. In operation, the conveyor belt scraper interacts with a conveyor belt 3 the lower run of which moves into direction B. The segment body 1 of the conveyor belt scraper is shown here in a loaded state in a possible installation position.

In its central part the segment body 1 has a mounting body 10 for connection to a segment carrier 20. The mounting body 10 comprises a first leg 13 and a second leg 14. The legs 13, 14 are formed in a substantially circular shape and extend in the portion of the outer circumferential surface of the segment carrier 20 while substantially enclosing the latter completely. Furthermore, the two legs 13, 14 are connected in the portion of their free longitudinal ends via a quick-release clamp 60, the legs 13, 14 each having recesses for connection with the quick-release clamp 60. The quick-release clamp 60 is disposed in the portion of the bottom side of the mounting body 10.

Furthermore, the segment body 1 has a holding portion 90 formed at the upper end of the segment body 1. In the portion of the left longitudinal end of the segment body 1 a first protective flap 70 is formed that extends over the mounting body 10. In the portion of the opposite longitudinal end of the holding portion 90 a second protective flap 80 is formed that also extends over the mounting body 10.

The segment body 1 is integrally formed. The segment body 1 consists of a synthetic material, such as polyurethane in some preferred examples.

The segment body 1 is in contact with a scraper rod 42 by means of its holding portion 90, the scraper rod 42 being rotatably supported in the holding portion 90. Furthermore, the scraper rod 42 is mounted in the holding portion 90 in such a way that the scraper rod 42 cannot carry out any movement in the longitudinal direction. Moreover, the scraper rod 42 is connected to a spatula holder 41 by means of a screw connection so as to be rotationally fixed wherein a spatula 40 is formed in the portion of a longitudinal end of the spatula holder 41.

FIG. 2 shows a part of the scraper 2 in a plan view, comprising the scraper rod 42, the spatula holder 41 and the spatula 40. The width of the spatula 40 is less than the width of the spatula holder 41. The spatula 40 is made of a hardened steel material.

FIG. 3 shows the segment carrier 20 in a sectional view. Said segment carrier 20 has a substantially hollow cylindrical design, wherein on opposite sides on the outer circumferential portion thereof a groove 21, 22 is respectively formed that interacts with a shaped element of the segment body 1 so that a form-locking connection is made. The segment carrier 20 consists of a steel material.

Referring to FIG. 4 and FIG. 5, a side view of the segment body 1 according to a second example disclosed herein is respectively shown in a non-tensioned state. The segment bodies 1 of FIG. 4 and FIG. 5 are identical, with different closure elements for connecting the two legs 13, 14 being used. FIG. 4 e.g. shows the use of a wing screw 66 while in FIG. 5 the use of a hexagon screw 67 is shown. Both the wing screw 66 and the hexagon screw 67 are held in an inner thread 65 which is formed in the portion of the free longitudinal end of both the first leg 13 and the second leg 14.

The holding portion 90 has a bore 91 for holding the scraper rod 42 (not shown) that extends through the entire holding portion 90.

The mounting body 10 has two bars 11, 12 that each are oppositely disposed on the inner circumferential surface of the mounting body 10 while the bar 11 in turn is disposed opposite the support portion 30.

FIG. 5 shows how the bore 91 for holding the scraper rod 42 (not shown) in a non-tensioned state is inclined by an angle $\alpha$ relative to the horizontal line. In a preferred example, the angle $\alpha$ is between 20 and 45°.

Figure 6:
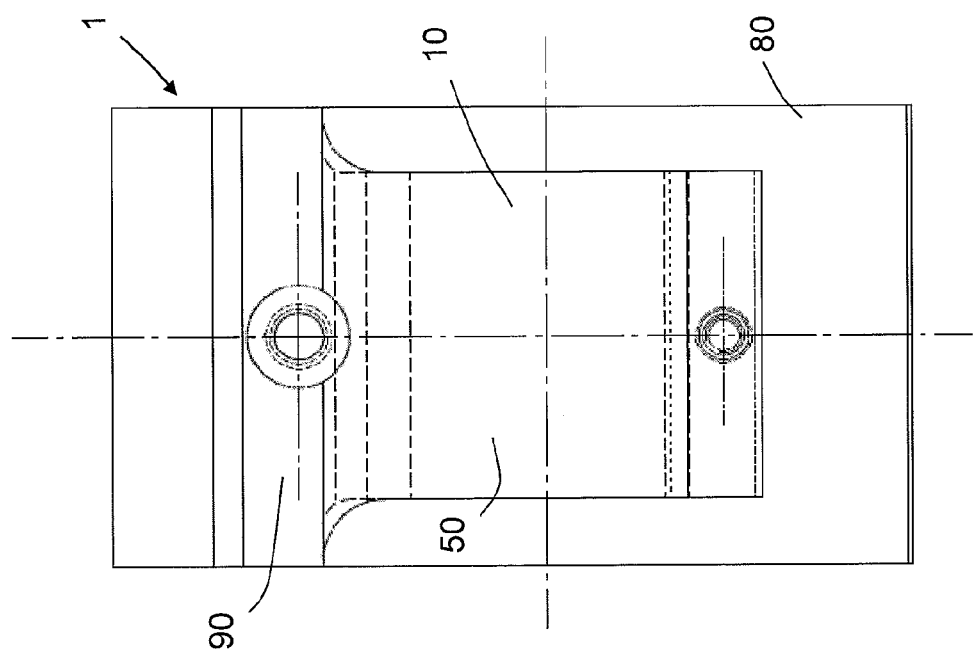
FIG. 6 shows a sectional view of the segment body from the rear according to FIG. 4.

FIG. 6 shows the segment body 1 in a sectional view from the rear along the sectional line A according to FIG. 4. Here, the first protective flap 70 is not shown while the second protective flap 80 covers the mounting body 10. The spring element 50 is integrally formed with the mounting body 10 and the holding portion 90.

FIG. 7 shows the segment body 1 according to FIG. 1 in a perspective view.

Figures 8, 9A, 9B:
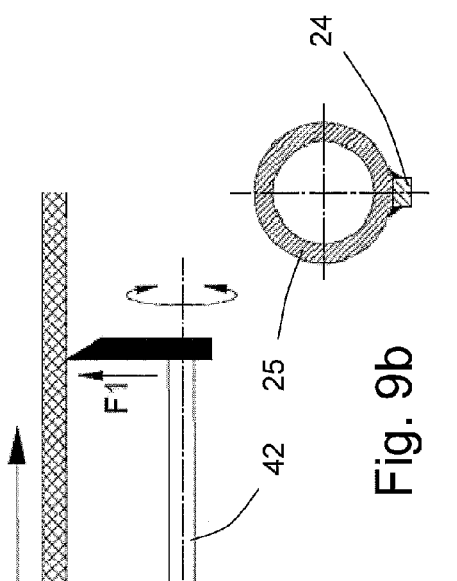
FIG. 8 shows a side view of the example segment body with the scraper according to FIG. 1 in a non-tensioned stated with a second example of the segment carrier.
FIG. 9a shows a side view of the example segment body with the scraper according to FIG. 1 in a tensioned state with the second example of the segment carrier.
FIG. 9b shows a sectional view of the second example of the segment carrier.

FIG. 8 shows a side view of the segment body with the scraper according to FIG. 1 in a non-tensioned state with a second example of the segment carrier. The spatula 40 is displaced towards the conveyor belt 3 for generating a press-on force in order to clean the latter, in this case in the direction V1. As soon as the spatula 40 is in contact with the conveyor belt 3 a reaction force is introduced into the spring element 50 via the holding portion 90 of the segment body 1 and stored therein. The scraper rod 42 and the spatula 40 are connected with one another so that they are rotationally fixed, the scraper rod 42 being rotatably supported in the holding portion 90 of the segment body 1. Under load the holding portion 90 can pivot relative to the mounting body 10 about an axis which is substantially parallel to the longitudinal axis of the mounting body 10.

FIG. 9a shows a side view of the example segment body with the scraper according to FIG. 1 in a tensioned state. In operation, the conveyor belt 3 moves in the direction B, the spatula 40 applying a press-on force F1 in the direction of the conveyor belt 3 to the outer circumferential surface thereof. Due to the force flow inside the segment body 1 a return force F2 results from the press-on force F1, which is applied by the spring element 50. In the tensioned operating position as shown, the scraper rod 42 is in a substantially horizontal position whereas again an inclined position is also possible in case of a further displacement of the conveyor belt scraper in the direction V1.

FIG. 9b shows a sectional view of the second example of the segment carrier 25 that is formed as a tubular body and has a welded-on bar 24 on the bottom surface thereof.

FIG. 10 shows a side view of the example segment body with the scraper according to FIG. 1 in a tensioned state with the first example of the segment carrier 20. The explanations as to the effect of the segment body 1 and the connected scraper rod 42 with the spatula 40 apply in correspondence to the above-described explanations according to FIG. 8 and FIG. 9a.

FIG. 11a shows a perspective sectional view of the first example of the segment carrier 20 according to FIG. 1 wherein said segment carrier 20 has a substantially tubular design. Furthermore, the segment carrier 20 has two grooves 21, 22 formed at the outer circumferential portion and disposed on opposite sides of the segment carrier 20.

FIG. 11b shows a perspective sectional view of a third example of the segment carrier 26 that also has a substantially tubular design. The segment carrier 26 has two bars 23, 24 that extend away from the outer circumferential portion of the segment carrier 26 and are disposed on opposite sides of the segment carrier 26. The segment carrier 26 is integrally formed.

Figure 12:
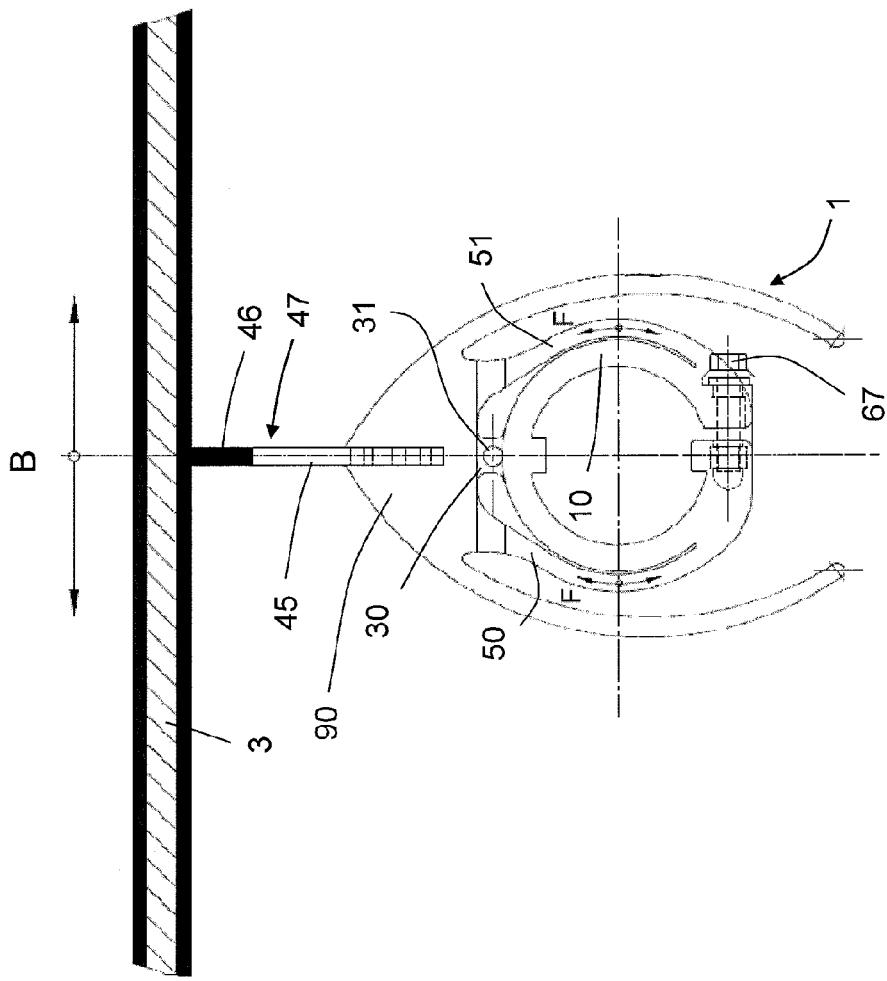
FIG. 12 shows a side view of a segment body with the scraper according to a fourth example disclosed herein.

FIG. 12 shows a side view of a segment body 1 with the scraper 47. The segment body 1 and the scraper 47 are formed such that it is possible to use the conveyor belt scraper in a reverse operating mode of the conveyor belt 3 according to the two illustrated movement directions B. The scraper 47 consists of the spatula 46 mounted to a spatula carrier 45, the scraper 47 having a substantially plate-like design. The spatula 46 and the spatula carrier 45 are integrally formed. The scraper 47 is held in the holding portion 90 of the segment body 1 in a vertical installation position. The scraper 47 is disposed in the central portion of the symmetrically formed holding portion 90. The holding portion 90 and the mounting body 10 are connected with one another via a support portion 30, the support portion 30 having a bar-like type design. In addition, the support portion 30 has a bore 31 in the central portion thereof that substantially runs parallel to the longitudinal axis of the mounting body 10.

The mounting body 10 and the holding portion 90 are connected by means of two oppositely arranged spring elements 50, 51. In the portion of the bottom surface of the mounting body 10, the spring elements 50, 51 each extend in a tangential direction about the outer circumferential portion of the mounting body 10, the spring elements 50, 51 in a non-tensioned state adjoining the outer circumferential portion of the mounting body 10 but being disposed spaced apart therefrom. The width of the spring elements 50, 51 respectively corresponds to the width of the mounting body 10. The mounting body 10 is fastened to the segment carrier 20 (not shown) via the hexagon screw 67.

Figure 13:
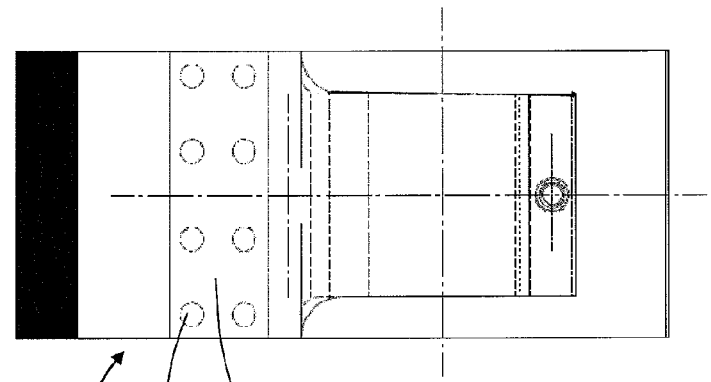
FIG. 13 shows a rear view of the segment body with the scraper according to FIG. 12.

FIG. 13 shows a rear view of the segment body with the scraper 47 according to FIG. 12. The scraper 47 is connected to the segment carrier 1 by means of a plurality of connecting holes 48 formed in the portion of the bottom surface of the spatula carrier 45 and correspondingly formed holding bolts disposed in the holding portion 90 of the segment carrier 1.

Figure 14:
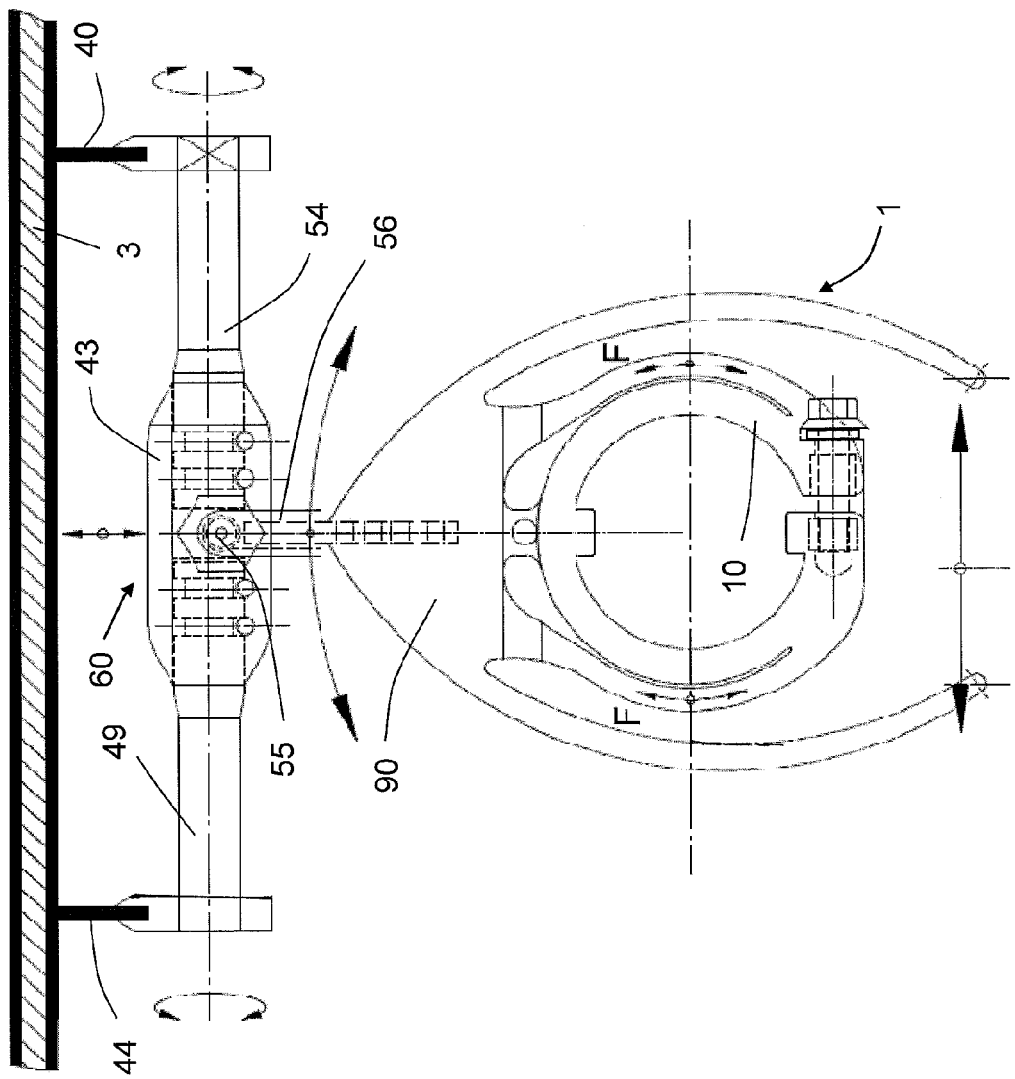
FIG. 14 shows a side view of a segment body according to the example of FIG. 12 comprising a double scraper.

FIG. 14 shows a side view of a segment body 1 according to FIG. 12, in which a double scraper 60 is formed for a two-step cleaning of the conveyor belt 3. The double scraper 60 consists of a first spatula 44 which serves to pre-clean the conveyor belt 3, and a second spatula 40 which serves to main-clean the conveyor belt 3. The first spatula 44 is mounted to a first rotating arm 49 in a rotationally fixed manner which in turn is rotatably supported in a holding body 43 in the portion of the longitudinal end thereof, wherein a longitudinal displacement of the first rotating arm 49 is not possible. The second spatula 40 is mounted to a second rotating arm 54 in a rotationally fixed manner which in turn is rotatably supported in the holding body 43 in the portion of the opposite longitudinal end thereof, wherein a longitudinal displacement of the second rotating arm 54 is not possible. Thus, the two spatulas 40, 44 can pivot independently of one another. The holding body 43 has a substantially cylindrical design.

The double scraper 60 is connected to the holding portion 90 of the segment body 1 via a double scraper holder 56. The double scraper holder 56 has a fastening pin 55 at a longitudinal end thereof, which holds the holding body 43 via a correspondingly formed bore in the holding body 43 so that the double scraper 60 can be pivoted about the fastening pin 55. In this case, the longitudinal axis of the fastening pin 55 is substantially parallel to the longitudinal axis of the mounting body 10. The double scraper holder 56 is also adapted for the reverse operating mode.

Figure 15:
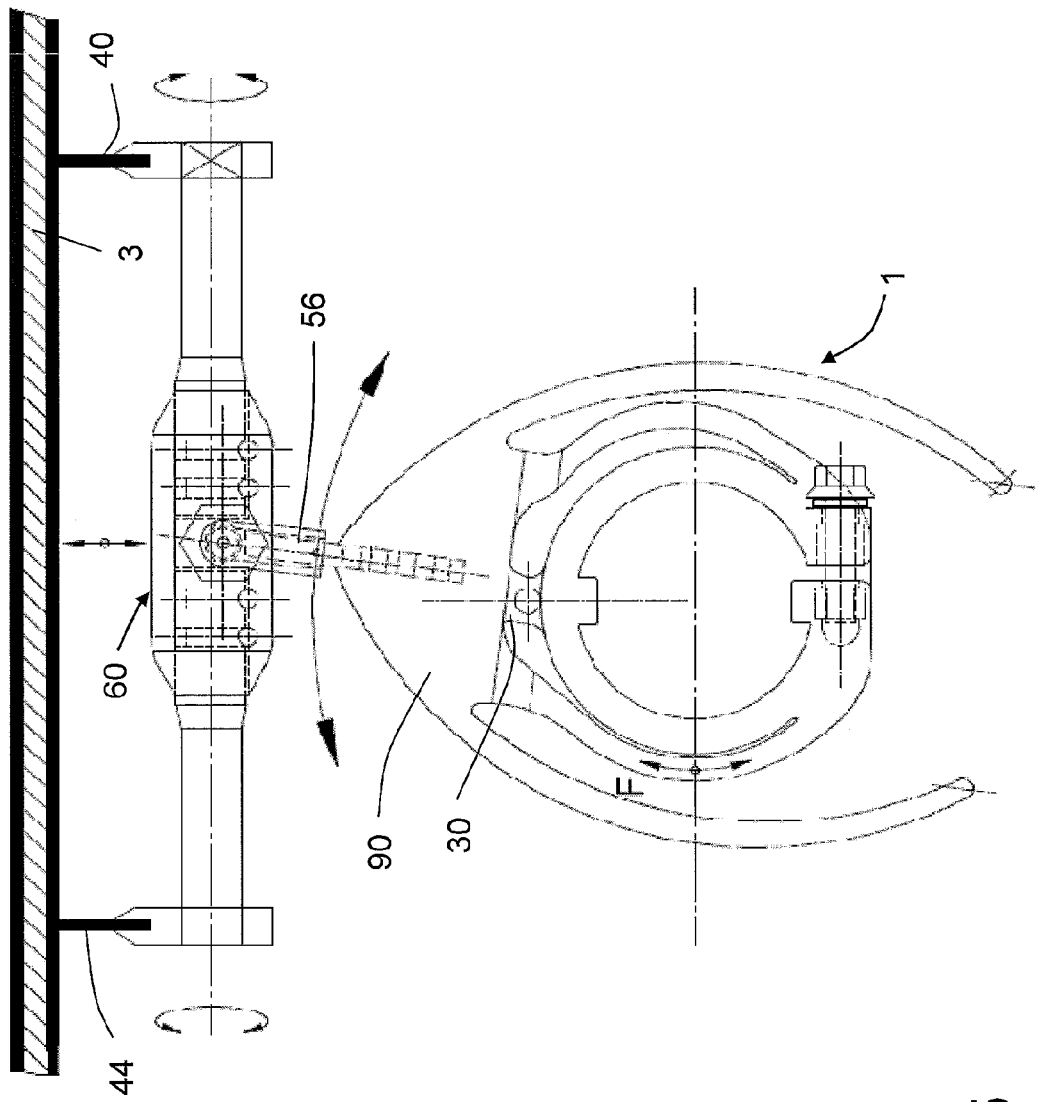
FIG. 15 shows a side view of the segment body with a double scraper according to FIG. 14 in a tensioned state.

FIG. 15 shows a side view of the segment body 1 with the double scraper 60 according to FIG. 14 in a tensioned state. Thus, the double scraper holder 56 and the holding portion 90 of the segment body under load can be pivoted about the holding portion 30 so that a respective spring element can hold a return force according to the above-described force flow through the interior of the segment body 1.

Figure 16:
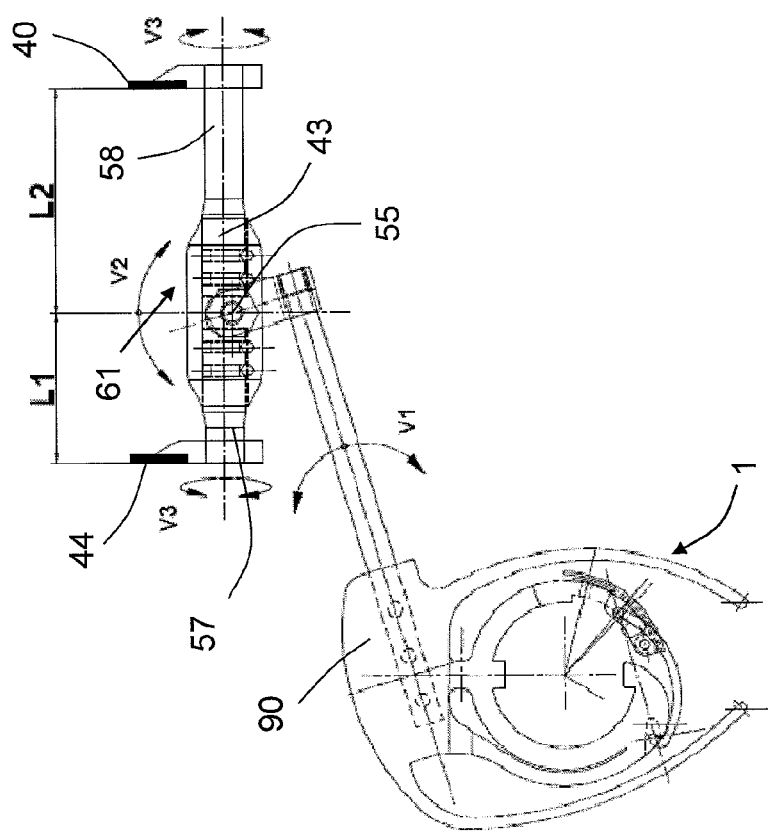
FIG. 16 shows a side view of a segment body according to FIG. 1 with a second example of the double scraper disclosed herein.

FIG. 16 shows a side view of a segment body 1 according to FIG. 1 with a double scraper 61 that differs from the above-described double scraper 60 of FIGS. 14 and 15 merely with regard to the lengths of the two rotating arms 57, 58. The first rotating arm 57 has a length L1 which is substantially shorter than the length L2 of the second rotating arm 58. The lengths L1 and L2 of the rotating arms 57, 58 can be selected such that a different press-on force can be realized in operation for the two spatulas 44, 40.

Figures 17, 18:
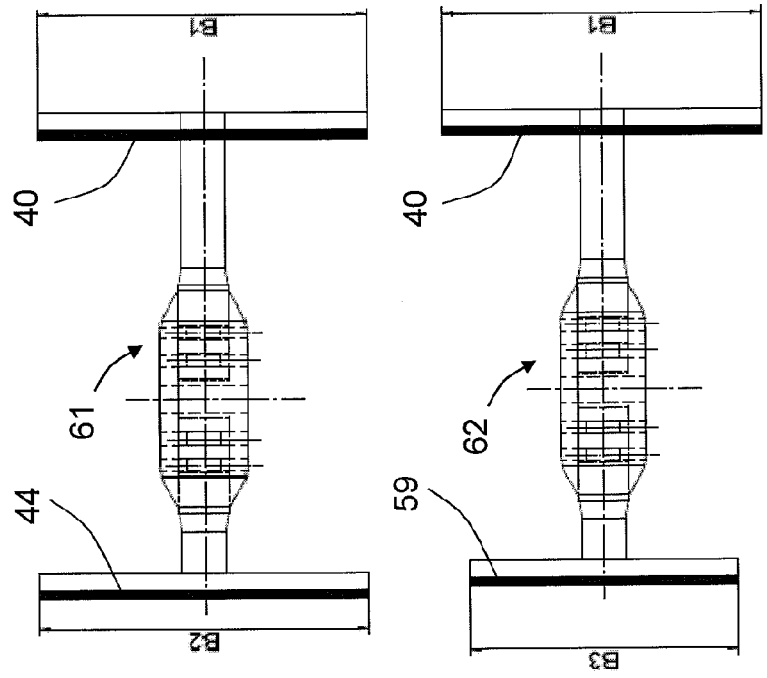
FIG. 17 shows a plan view of the double scraper according to FIG. 16.
FIG. 18 shows a plan view of the third example of the double scraper according to FIG. 16.

FIG. 17 shows a plan view of the double scraper according to FIG. 16, the width B2 of the first spatula 44 and the width B1 of the second spatula 40 being identical.

FIG. 18 shows a plan view of a double scraper 62, the width B3 of a first spatula 59 being smaller than the width B1 of the second spatula 40.

FIG. 19 shows a side view of the segment body 1 with the scraper 61 according to FIG. 16 in a non-tensioned state. The conveyor belt scraper is displaced in a direction Y towards the conveyor belt 3 or away from the same in order to adjust the return and press-on force and is spaced apart by the length X1 from the conveyor belt 3 in the position as shown.

FIG. 20 shows a side view of a fourth example of the double scraper 63, wherein the first spatula 44 is disposed at an angle of $\alpha 1=90°$ relative to the longitudinal axis of the holding body 43 whereas the second spatula 65 is disposed at an angle of $\alpha 2$ of less than 90° relative to the longitudinal axis of the holding body 43. Thus, the press-on force of the second spatula 65 can be additionally adjusted by means of the angle $\alpha 2$.

FIG. 21 shows a side view of the conveyor belt scraper with the double scraper 61 according to FIG. 16 in a tensioned state, the latter being spaced apart from the conveyor belt 3 by the length X2.

Figure 22:
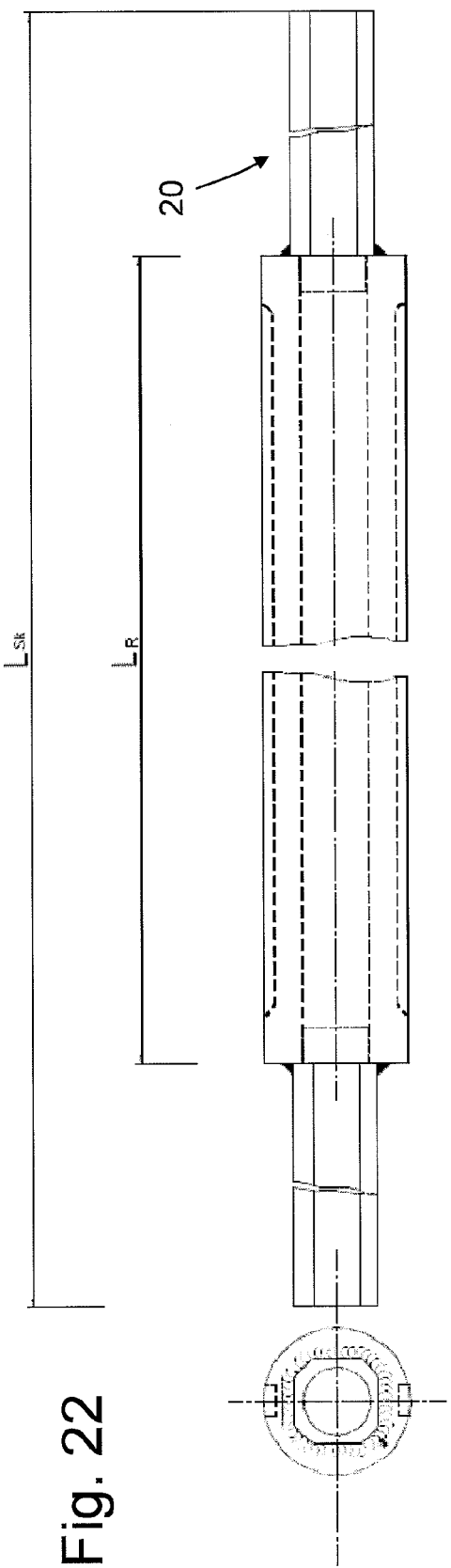
FIG. 22 shows a plan view and a front view of the segment carrier according to FIG. 11a, FIG. 23 shows a side view of a fifth example of the scraper including a first direction of movement of the conveyor belt.

FIG. 22 shows a plan view and a front view of the segment carrier 20 according to FIG. 11a, the latter having a total length $L_{SK}$ and a portion of the length $L_R$ for holding segment bodies.

Figure 23:
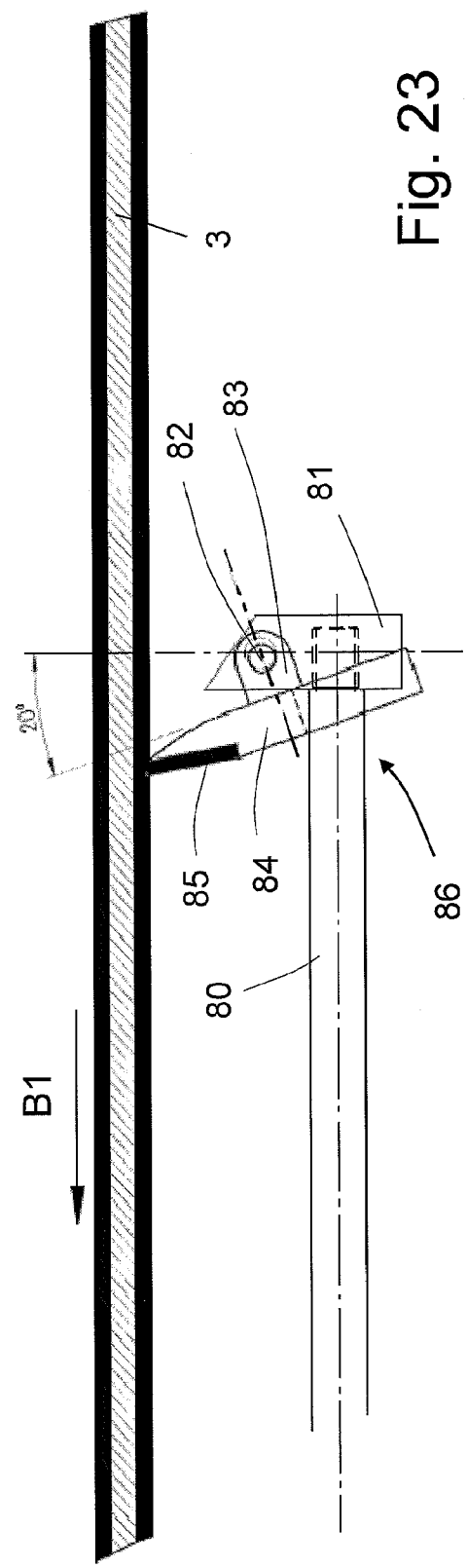

FIG. 23 shows a side view of a fifth example of the scraper 86 with a first movement direction B1 of the conveyor belt 3, the scraper 86 being formed such that the spatula 85 can be pivoted. The scraper 86 consists of a scraper rod 80 having a thread at one longitudinal end for a rotationally fixed screw connection to a coupling body 81. The coupling body 81 has a bolt 82 in the portion of a longitudinal end, which is in contact with a spatula connecting member 83 so that a joint is formed. The spatula connecting member 83 is connected to a spatula carrier 84 at the longitudinal end of which the spatula 85 is formed. When in contact with a conveyor belt 3 moving along the movement direction B1, the free longitudinal end of the spatula 85 is in a position that the spatula carrier 84 is rotated by 20° relative to the transverse direction of the conveyor belt 3.

FIG. 24 shows a side view of the scraper 86 according to FIG. 23 with a second movement direction B2 of the conveyor belt 3, the spatula carrier 85 being limited by abutment to the coupling body 81 and being in a position parallel to the same. The spatula 85 is inclined by 9° relative to the spatula carrier 84.

FIG. 25 shows a plan view of the scraper 86 according to FIG. 24. The spatula connecting member 83 is welded to the spatula carrier 84.

FIG. 26 shows a side view of a sixth example of the segment body 100 comprising a wear element 110 which in operation realizes the function of a scraper. The wear element 110 has a curved design which has a substantially tapering design in the portion of the free longitudinal end. The wear element 110 is integrally connected to a mounting body 120 and a spring element 140 via a deformable portion 150. In some preferred examples, the segment body 100 consists of a synthetic material, in particular of polyurethane. The spring element 140 is connected to the mounting body 120 at the other longitudinal end thereof and disposed in a manner spaced-apart from the outer circumferential portion of the mounting body 120 and adjacent to the latter. For a form-locking connection to the segment carrier (not shown) the mounting body 120 has two oppositely disposed bars on the inner circumferential surface thereof. Furthermore, the segment body 100 has a first protective flap 103 connected to the wear element 110 and extending over the whole mounting body 120. Moreover, the segment body 100 has a second protective flap 104 that is tangentially formed to the spring element 140 and also extends over the whole mounting body 120.

FIG. 27 shows a rear view of the segment body 100 according to FIG. 26.

FIG. 28 shows a side view of a seventh example of the segment body 101 with the wear element 110 as a scraper according to examples disclosed herein wherein merely the design of the deformable portion 150 and the connection thereof to the spring element 140 are different as compared to the example according to FIG. 26. The deformable portion 150 substantially has a bar-like design to which a longitudinal end of the spring element 140 is connected. The distance between the spring element 140 and the mounting body 120 is larger in the connecting portion thereof than in the example according to FIG. 26.

Furthermore, the segment body 101 shows a first protective flap 105 connected to the wear element 110 and extending over the whole mounting body 120. Moreover, the segment body 101 has a second protective flap 106 tangentially formed to the wear element 110 and extending over the whole mounting body 120 and the whole spring element 140.

Figure 29:
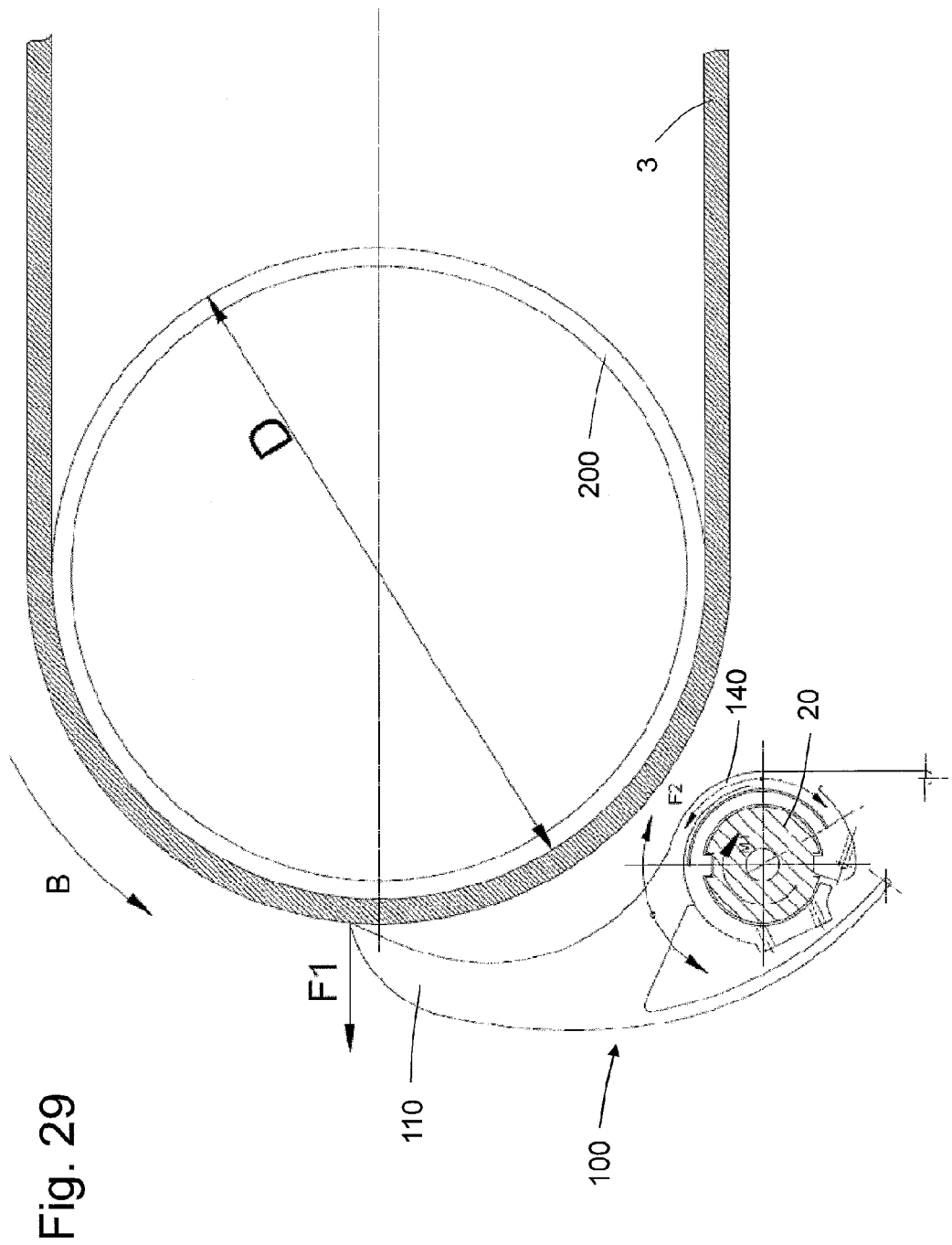
FIG. 29 shows a side view of the segment body with the wear element according to FIG. 26 in operation.

FIG. 29 shows a side view of the segment body 100 with the wear element 110 according to FIG. 26 in operation, the wear element 110 being in linear contact with the circulating conveyor belt 3. The conveyor belt 3 is driven by a drum 200 that has a diameter D. The tensioning of the wear element 110 against the conveyor belt 3 generates a press-on force F1 which causes a return force F2 in the spring element 140. The tensioning of the wear element 110 is made by means of a torque M1 which is introduced into the segment body 100 via the segment carrier 20.

Figure 30:
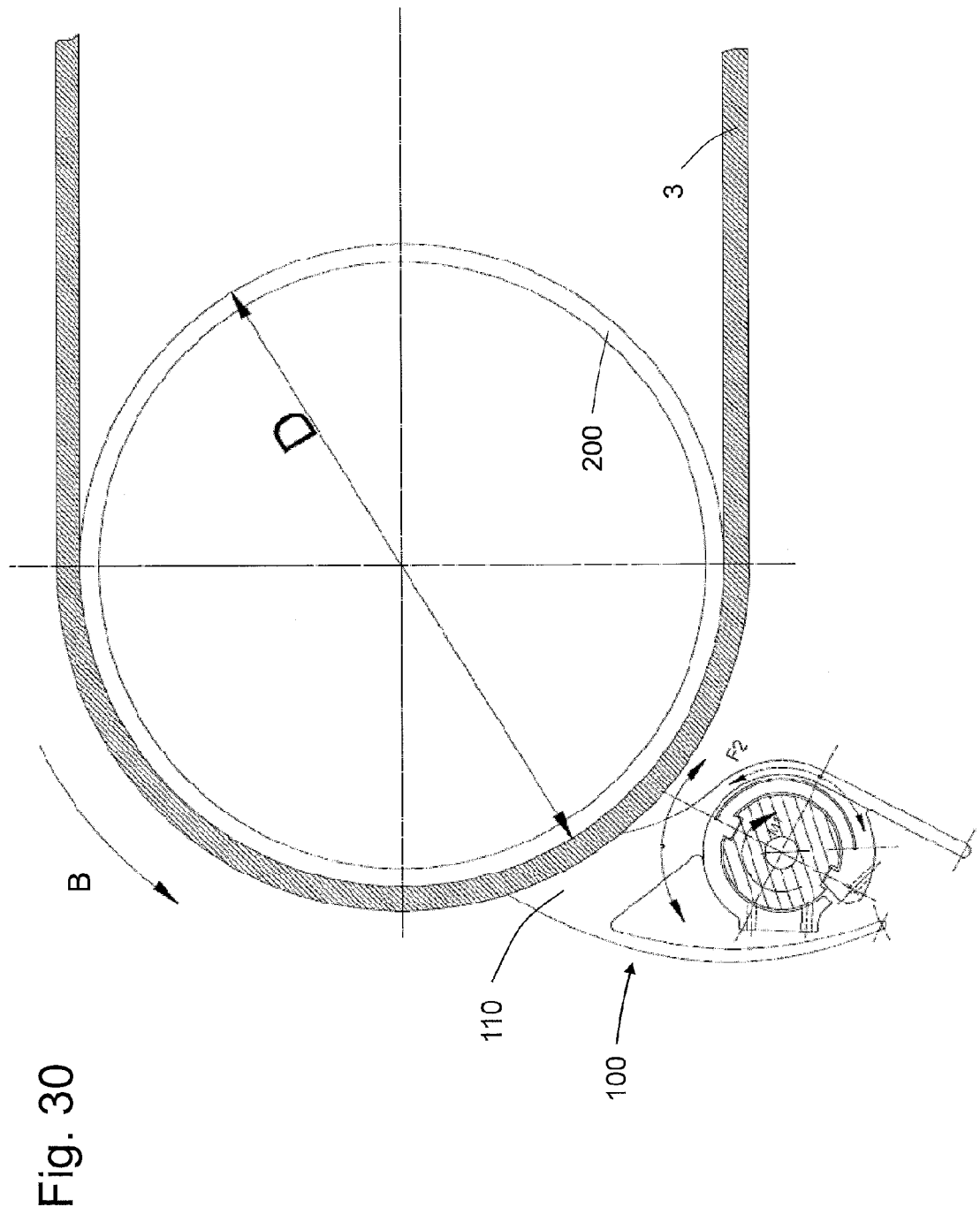
FIG. 30 shows a side view of the segment body with the wear element according to FIG. 26 in a worn state.

FIG. 30 shows a side view of the segment body 100 with the wear element 110 as a scraper according to FIG. 26 in a worn state. The wear element 110 is now in contact with the conveyor belt 3 via a contact surface, the friction force being increased as compared to the state of FIG. 29. Due to the set return force the wear element 110 always moves in the direction of the conveyor belt 3 so that the cleaning thereof is ensured despite the wear.

Figure 33:
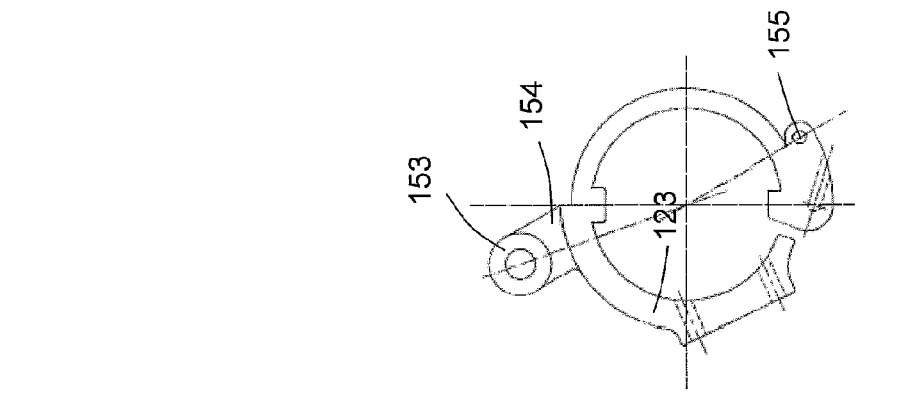
FIG. 33 shows a side view of a mounting body for the segment body according to FIG. 31.
Figure 32:
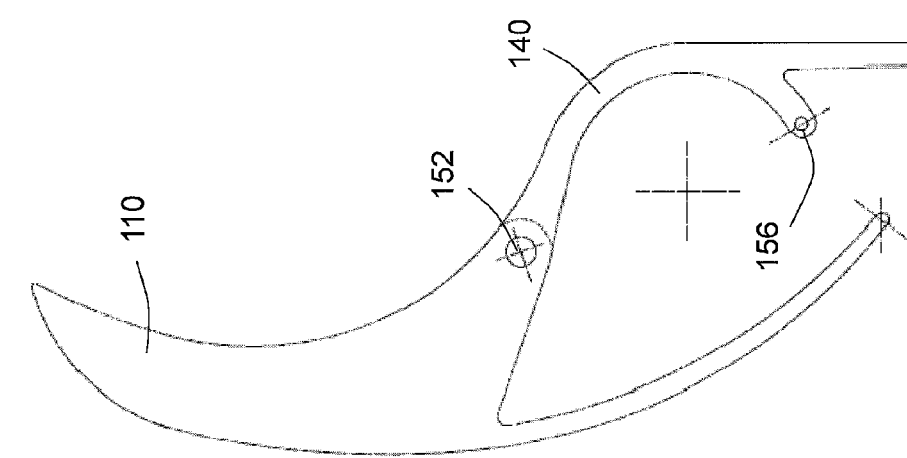
FIG. 32 shows a side view of the wear element and a spring element for the segment body according to FIG. 31.
Figure 31:
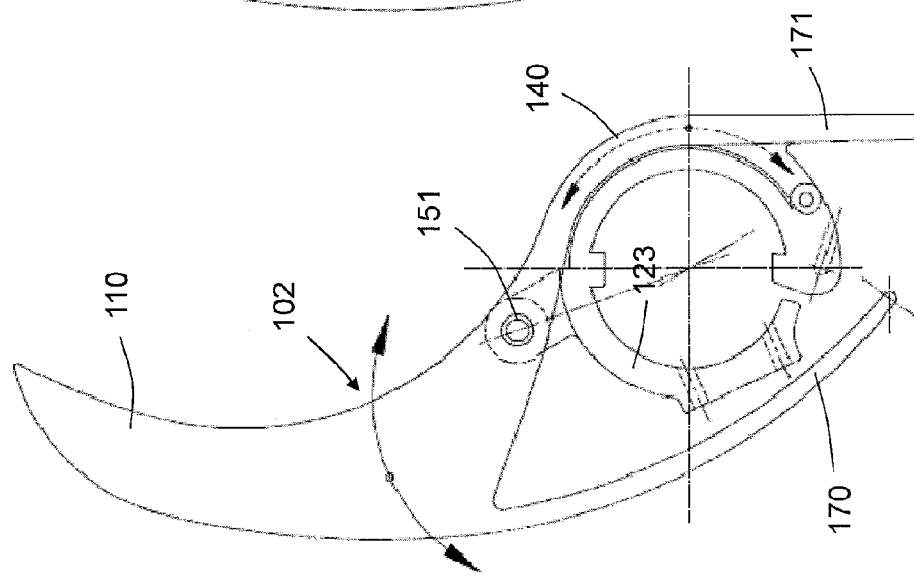
FIG. 31 shows a side view of an eighth example of the segment body with the wear element as a scraper according to examples disclosed herein.

Referring to FIGS. 31 to 33, an eighth example of the segment body 102 with the wear element 110 will be described wherein said example essentially only differs in the construction of the mounting body 123 and the deformable area 151 from the example according to FIG. 26. The deformable area 151 is formed such that it realizes a joint connection between the wear element 110 and the spring element 140, the wear element 110 and the spring element 140 each being separate components. To this end, the segment body 102 has a bore 152 in the deformable area 151, which extends substantially parallel to the longitudinal axis of the mounting body 123. The spring element 140 has a second bore 156 in the range of one longitudinal end which realizes a force input from the mounting body 123 into the segment body 102 via a first bolt (not shown) with a corresponding connecting bore 155 in the mounting body 123. Furthermore, the mounting body 123 has a lever-like shaped connecting body 154 on the opposite side of the connecting bore 155, which connecting body 154 has a joint connecting portion 153 with a hollow-cylindrical design at the free longitudinal end thereof for connection with the bore 152 of the deformable portion 151. Thus, the wear element 110 can pivot under the influence of the return force of the spring element 140 in the direction of the conveyor belt 3 (not shown).

Furthermore, the segment body 102 has a first protective flap 170 that is connected to the wear element 110 and extends over the whole mounting body 123. Moreover, the segment body 102 has a second protective flap 171 that is tangentially formed to the spring element 140 and extends over the whole mounting body 123.

The examples as shown are to be construed to be merely illustrative and not limiting. Numerous modifications can be made to them without leaving the protective scope of the claims.

Although certain methods, apparatus, systems, and articles of manufacture have been disclosed herein, the scope of coverage of this patent is not limited thereto. To the contrary, this patent covers all methods, apparatus, systems, and articles of manufacture fairly falling within the scope of the claims either literally or under the doctrine of equivalents

What is claimed is:

1. A segment body for a conveyor belt scraper, comprising:
a mounting body that can be connected to a segment carrier in a rotationally fixed manner,
a holding portion that is designed for applying force from at least one wear element,
a support portion in contact with the holding portion and the mounting body, and at least one spring element provided between the holding portion and the mounting body, which interacts with the mounting body and the holding portion in such a way that a force can be transmitted from the at least one spring element to the holding portion, wherein at least one portion of the at least one spring element and at least one wear element in the tensioned state of the spring element are oppositely disposed relative to a longitudinal axis of the mounting body located inside the inner side of the mounting body so that they are spaced apart.

2. The segment body according to claim 1, wherein the segment body is an integral component.

3. The segment body according to claim 1, wherein the segment body has a quick release clamp.

4. The segment body according to claim 1, wherein the at least one spring element shows a change of length under load.

5. The segment body according to claim 4, wherein the at least one spring element is replaceably connectable to the mounting body and the holding portion.

6. The segment body according to claim 1, wherein the width of the at least one spring element substantially corresponds to the width of the mounting body.

7. The segment body according to claim 1, wherein the thickness of the at least one spring element can be selected differently.

8. The segment body according to claim 7, wherein the material of the at least one spring element is different from the material of the segment body.

9. The segment body according to claim 1, wherein the segment body has at least one protective flap arranged at a portion of the mounting body.

10. The segment body according to claim 1, wherein the at least one spring element in a tensioned state is substantially subjected to tension.

11. The segment body according to claim 1, wherein the segment body consists of an elastic material.

12. The segment body according to claim 1, wherein the holding portion is moveable relative to the mounting body via the support portion.

13. The segment body according to claim 12, wherein the mounting body is friction-locked with the segment carrier.

14. A segment body with a scraper, comprising at least one segment body for a conveyor belt scraper according to claim 1, wherein the at least one wear element substantially has the design of a spatula.

15. The segment body with the scraper according to claim 14, wherein the at least one wear element is rotatably supported parallel to the longitudinal axis thereof so that the at least one wear element can be folded down.

16. A conveyor belt scraper for receiving at least one segment body with the scraper according to claim 14, wherein at least one segment body with the scraper is attached to the segment carrier in a rotationally fixed manner.

17. A segment body for a conveyor belt scraper, comprising:
a mounting body that can be connected to a segment carrier in a rotationally fixed manner,
a holding portion that is designed for applying force from at least one wear element,
a support portion in contact with the holding portion and the mounting body, and at least one spring element provided between the holding portion and the mounting body, which interacts with the mounting body and the holding portion in such a way that a force can be transmitted from the at least one spring element to the holding portion, wherein at least one portion of the at least one spring element is disposed substantially adjacent to the outer portion of the mounting body, and wherein in the portion adjacent to the spring element and the mounting body the design of the spring element substantially corresponds to the design of the mounting body.

18. A segment body for a conveyor belt scraper, comprising:
a mounting body that can be connected to a segment carrier in a rotationally fixed manner,
a holding portion that is designed for applying force from at least one wear element,
a support portion in contact with the holding portion and the mounting body, and at least one spring element provided between the holding portion and the mounting body, which interacts with the mounting body and the holding portion in such a way that a force can be transmitted from the at least one spring element to the holding portion, wherein the mounting body has at least one connecting element at the inner circumferential surface thereof for a form-fitting connection of the mounting body with the segment carrier.

19. A segment body with a scraper, comprising at least one segment body for a conveyor belt scraper, the at least one segment body for the conveyor belt scraper comprising:
a mounting body that can be connected to a segment carrier in a rotationally fixed manner,
a holding portion that is designed for applying force from at least one wear element,
a support portion in contact with the holding portion and the mounting body, and at least one spring element provided between the holding portion and the mounting body, which interacts with the mounting body and the holding portion in such a way that a force can be transmitted from the at least one spring element to the holding portion, wherein the at least one wear element substantially has the design of a spatula, and wherein a double holding body is connected to the holding portion so as to be rotationally fixed in the transverse direction of the mounting body, and the double holding body can be pivoted about an axis parallel to the longitudinal axis of the mounting body, and in the double holding body a respective wear element is supported on opposite sides so as to be rotatable in the transverse direction of the mounting body.

20. A conveyor belt scraper for receiving at least one segment body with a scraper, the at least one segment body comprising:
a mounting body that can be connected to a segment carrier in a rotationally fixed manner,
a holding portion that is designed for applying force from at least one wear element,
a support portion in contact with the holding portion and the mounting body, and at least one spring element provided between the holding portion and the mounting body, which interacts with the mounting body and the holding portion in such a way that a force can be transmitted from the at least one spring element to the holding portion, wherein the at least one wear element substantially has the design of a spatula, and wherein the segment carrier has at least one groove in the outer circumferential portion.

21. The conveyor belt scraper according to claim 20, wherein the segment carrier has at least one bar in the outer circumferential portion which extends away from the segment carrier.

22. A segment body, comprising:
a mounting body that can be connected to a segment carrier in a rotationally fixed manner, and
a wear element that is integrally connected to at least one spring element in an articulated manner by means of a deformable portion, wherein the at least one spring element interacts with the mounting body and the wear element in such a way that the deformable portion in a tensioned state of the at least one spring element transmits a force between the at least one spring element and the wear element in an articulated manner, and at least one portion of the at least one spring element and the wear element in a tensioned state of the at least one spring element are oppositely disposed relative to a longitudinal axis of the mounting body located inside the inner side of the mounting body so that they are spaced apart.

* * * * *